Aug. 13, 1929.     P. KAPFHAMMER     1,724,600
DOUGHNUT HANDLING MACHINE
Filed Sept. 22, 1926     2 Sheets-Sheet 1
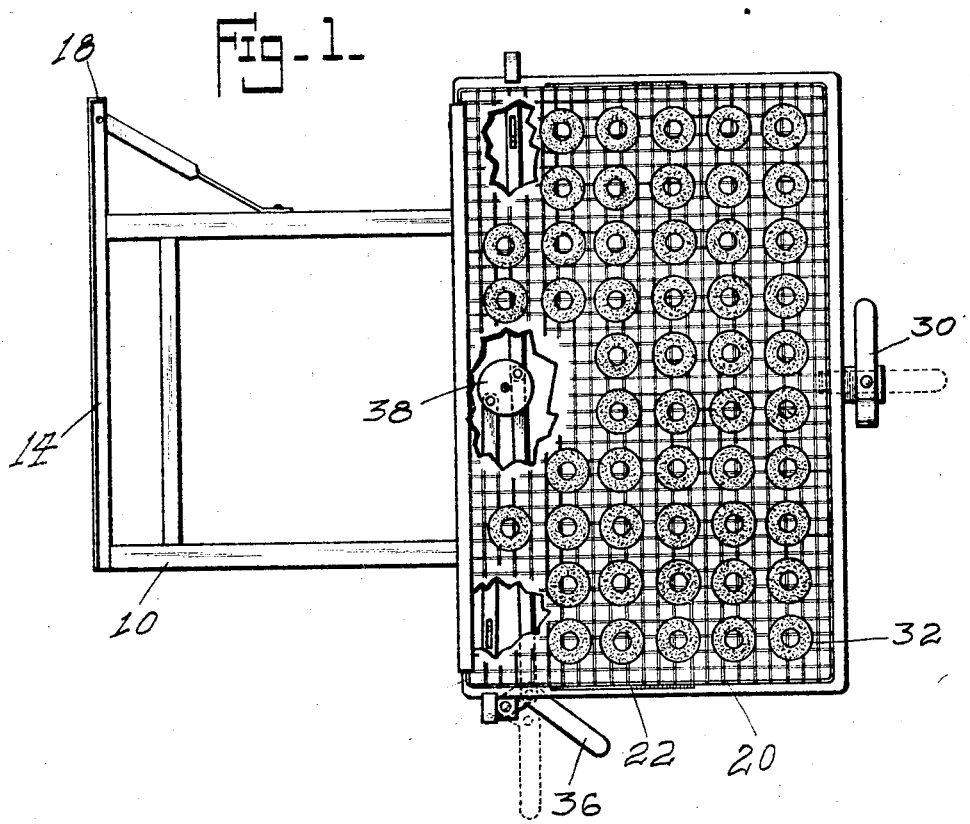
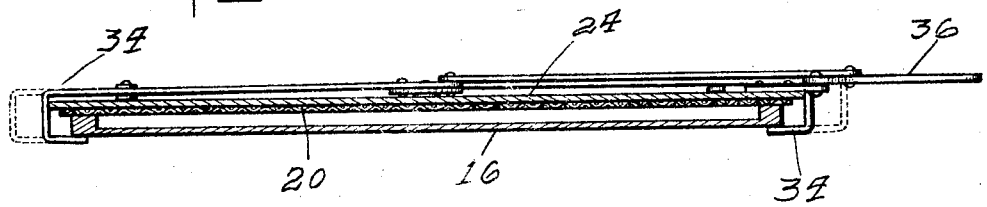
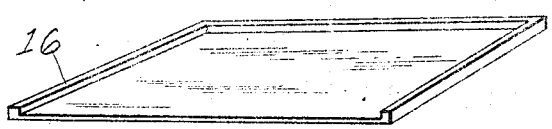

Aug. 13, 1929.　　　P. KAPFHAMMER　　　1,724,600
DOUGHNUT HANDLING MACHINE
Filed Sept. 22, 1926　　　2 Sheets-Sheet 2
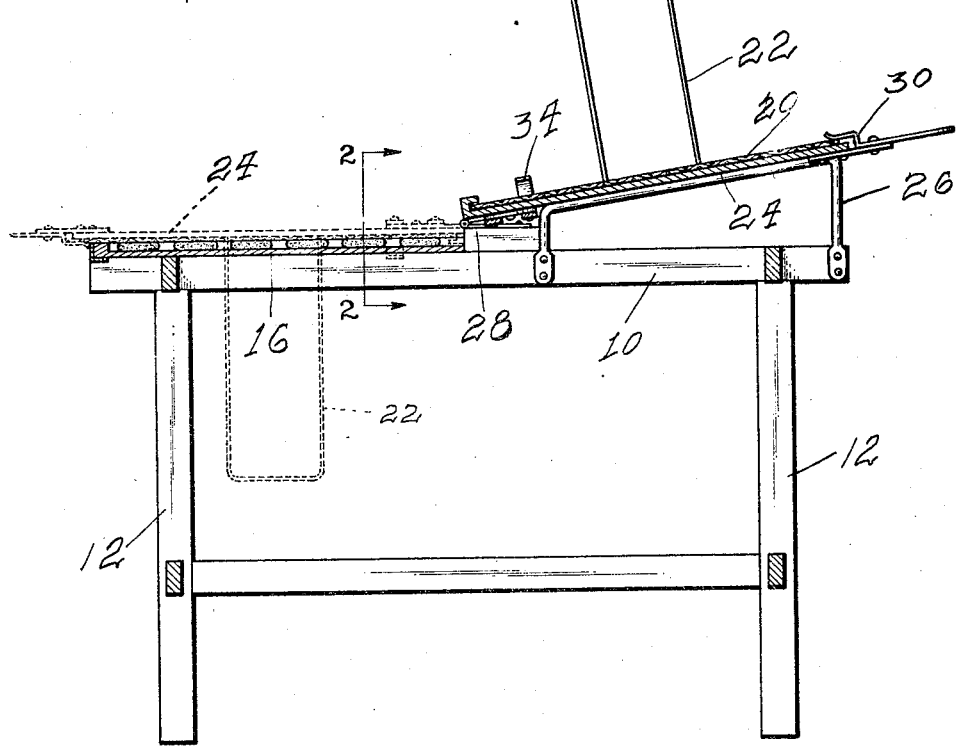
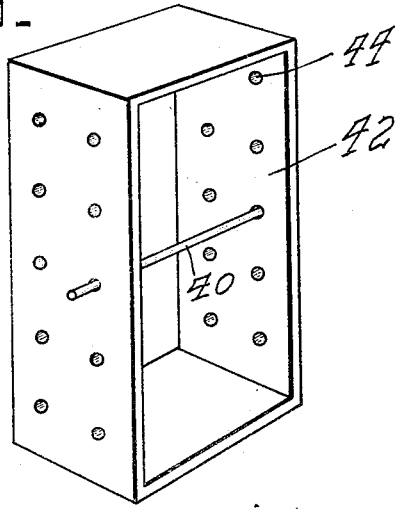
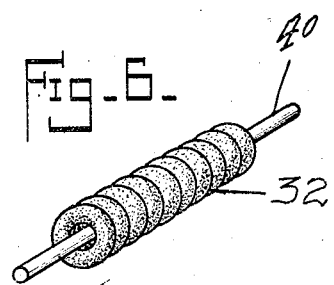
Paul Kapfhammer
INVENTOR
BY Albert J. Fihe
ATTORNEY Patented Aug. 13, 1929.

1,724,600

UNITED STATES PATENT OFFICE.

PAUL KAPFHAMMER, OF LOUISVILLE, KENTUCKY.

DOUGHNUT-HANDLING MACHINE.

Application filed September 22, 1926. Serial No. 136,968.

This invention relates to an improved doughnut handling machine and has for one of its principal objects the provision of a device for handling and transferring a plurality of doughnuts, or similar elements, from one stage in their manufacture to another stage, and at a single operation.

One of the important objects of this invention is the provision, in a doughnut handling machine, of transfer means including a seasoning board whereon the formed doughnuts, cookies or the like are placed, after being prepared from the dough, and an additional element operatively associated therewith for receiving said doughnuts after seasoning and for supporting the same while in the cooking process. Still another important object of this invention is to provide in a machine for handling doughnuts, in the process of manufacture, a rack and supporting means associated therewith for storing doughnuts after they are fried and for readily sugaring the same, in an efficient manner.

Other and further important objects of this invention will be apparent from the disclosures in the drawings and following specification.

The invention in a preferred form is illustrated in the drawings and hereinafter more fully described.

In the drawings:

Figure 1 is a top plan view of the doughnut transferring device of this invention, the parts being broken away to show the clamping elements.

Figure 2 is a vertical sectional view taken on the line 2—2 of Figure 4, illustrating particularly the seasoning tray for the doughnuts, the wire griddle, which receives the same from the tray, and the clamping means for maintaining the tray and the griddle in associated position during the transfer.

Figure 3 is a perspective view of the seasoning tray.

Figure 4 is a vertical section thru the machine, showing the seasoning tray containing the doughnuts in original position, and showing the wire griddle in position before transfer.

Figure 5 is a perspective view of the rack used for storing the doughnuts after they are fried.

Figure 6 is a perspective view, illustrating a string of doughnuts placed upon a supporting bar used with the rack and in position for sugaring.

As shown in the drawings:

The reference numeral 10 indicates generally the supporting frame for improved doughnut transfering means of this invention. As shown in Figure 4 the frame is supported on legs 12, and is provided at one end with an angle iron terminal 14, extending across said end and which forms part of the supporting means for a doughnut seasoning tray 16. At one end of the angle iron element 14 is a bent over stop 18, which acts to properly position the tray 16, on the machine, with respect to a wire griddle 20, which is adapted to receive the doughnuts in the transfer operation, and to support the same while being fried.

This griddle 20 is provided with handles 22 which extend upwardly therefrom, and the griddle itself is normally supported upon a shelf, or the like, 24, mounted upon the frame 10 and maintained at a suitable angle with respect thereto by means of supporting brackets 26.

The shelf 24 is hinged to the frame 10, as shown at 28, and is adapted for movement into doughnut receiving position over the tray 16, when the tray is supported on the frame 10. This position is illustrated in the dotted lines in Figure 4.

In order to support the griddle 20 in proper relation to the shelf 24, a clamping means is provided, as shown at 30, comprising a hook having an integral handle and pivoted for motion into locking and release positions, as shown in Figure 1.

The tray 16 having been filled with doughnuts 32, spaced thereon in a regular manner, the doughnuts are allowed to season in the tray, either before or after the tray is placed in the frame 10. When the tray is positioned in the frame, the griddle 20, together with the shelf 24 attached thereto, are brought over into the position shown in the dotted lines in Figure 4, and in this position the locking elements 34 are operated, by means of the handle 36—thereby locking the shelf 24, the griddle 20, and the tray 16, with the doughnuts supported thereon, into a unit. The locking or clamping elements 34 are operated by means of a locking means in the form of a disc 38, which actuates the locking elements 34 at each end of the associated tray and griddle in an obvious manner.

When these elements are all locked together, the whole as a unit are again swung over to the right-hand side of the machine, and the tray 16 is then removed, the doughnuts remaining on the griddle 20, as shown in Figure 1. The tray is removed after a release movement of the handles 36, and after a release movement of the handle 30, the griddle 20 can be removed with the doughnuts thereon and placed in the doughnut frying vat.

After the doughnuts are fried they are strung on a number of rods 40, which are then placed in a suitable rack 42, comprising an open ended box, having openings 44 therein, as shown in Figure 5. The doughnuts are stored in this rack 42, until wanted, and in the meantime can be conveniently sugared by simply rolling the stick 40 with a string of doughnuts 42 thereon, over a sugared board.

It will be obvious that herein is provided a means for handling and transferring doughnuts, or similar articles during the cooking or manufacturing process, which means eliminates a great deal of labor ordinarily involved in the handling of such articles, as it allows a plurality of doughnuts to be moved at a single operation. Further, the articles of food are not touched by the human hand during this process, resulting in a very clean and desirable product.

I am aware that many changes might be made and numerous details of construction varied throughout a wide range without departing from the principles of this invention, and I therefore do not purpose limiting the patent granted hereon otherwise than as necessitated by the prior art.

I claim as my invention:

A doughnut handling machine, including in combination a frame, a doughnut seasoning tray, removably positioned on the frame, a doughnut receiving griddle, also removably positioned on the frame, and means for associating the tray and griddle for doughnut transferring relation, said means including a shelf hinged at one side to the transverse center of the frame and adapted to support the griddle, and means for locking the griddle to said shelf, together with additional means for locking the shelf, griddle and tray together, said additional means comprising two latches, one positioned on each end of the shelf, the said latches being lever actuated and simultaneously operated into locking and unlocking position, said simultaneous operating means comprising a disk pivotally mounted to the tray, a pair of bars extending longitudinally across the tray, the ends of said bars being bent upwardly to form latches, eccentric connections between the bars and the said disk, and a pivoted handle at one end of one of said bars adapted to operate both of said latches through rotation of the said disk.

In testimony whereof I affix my signature.

PAUL KAPFHAMMER.